United States Patent [19]

Blaha

[11] Patent Number: 5,301,905

[45] Date of Patent: Apr. 12, 1994

[54] AIRCRAFT ICING DETECTION SYSTEM

[76] Inventor: David A. Blaha, 3323 W. Ridgewood Dr., Parma, Ohio 44134

[21] Appl. No.: 995,446

[22] Filed: Dec. 23, 1992

[51] Int. Cl.$^5$ ............................................. B64D 15/20
[52] U.S. Cl. ................................ 244/134 F; 244/134 D
[58] Field of Search ............ 244/134 R, 134 F, 134 D; 340/580, 582; 73/178 R; 60/39.093

[56] References Cited

U.S. PATENT DOCUMENTS

| | | | |
|---|---|---|---|
| 2,916,731 | 12/1959 | Foster | 244/134 F |
| 2,947,835 | 8/1960 | Flubacker et al. | 244/134 R |
| 3,917,193 | 11/1975 | Runnels, Jr. | 244/207 |
| 5,062,120 | 10/1991 | Daly et al. | 340/580 |

FOREIGN PATENT DOCUMENTS 553612  2/1958  Canada ............................ 244/134 F

*Primary Examiner*—Michael S. Huppert
*Assistant Examiner*—Virna Lissi Ansley
*Attorney, Agent, or Firm*—Ralph E. Jocke

[57] ABSTRACT

An aircraft icing detection system detects accumulation of ice on an upper surface (12) of a wing (10) of an aircraft. The system includes an air pump (18) that delivers air through first and second conduits (24, 26). The first conduit delivers air through a first air knife (32) to openings (34) in the upper surface of the wing. The second conduit delivers air through a lower wing surface (14) through openings in a second air knife (42). When ice accumulates on the upper surface, flow from the first air knife is restricted. A differential pressure sensor (46) senses a pressure difference between the conduits and warns the pilot of possible ice accumulation by illuminating a warning light (50).

15 Claims, 3 Drawing Sheets 5,301,905

AIRCRAFT ICING DETECTION SYSTEM

TECHNICAL FIELD

This invention relates to a system for detecting excessive accumulation of ice on the wing surfaces of an aircraft.

BACKGROUND ART

The accumulation of ice on the wing surfaces of an aircraft prior to takeoff can adversely affect the ability of the craft to fly. Excessive ice buildup, if undetected, may cause an aborted takeoff or crash.

Currently the presence of ice on the wings of aircraft is detected by visual inspection. Such inspection may be unreliable particularly when visibility is impaired by fog, falling snow, freezing rain and/or by darkness. Often, because of delays, it is not possible to de-ice the aircraft shortly before takeoff. For these reasons there is always some risk of a dangerous accumulation of ice prior to takeoff in wintry conditions.

In the past, others have developed ice detectors for aircraft. For example, U.S. Pat. Nos. 4,095,456; 3,996,787; 3,976,270; and 4,053,127 disclose devices for detecting ice accumulation. However, these devices check for ice accumulation during flight at a leading edge of an aircraft surface such as at the leading edge of a wing or nacelle. These devices are not adapted to check for ice on the lifting surfaces of the wings prior to takeoff.

In addition, most of these prior art devices detect only the rate of ice accumulation. They do not detect total accumulation which is critical in determining if the lifting ability of the wings of the aircraft has been impaired.

Thus, there exists a need for an aircraft icing detection system that accurately and reliably detects accumulation of ice on the wings of an aircraft prior to takeoff.

DISCLOSURE OF INVENTION

It is an object of the present invention to provide a system for detecting ice accumulation on an exterior surface of an aircraft prior to takeoff.

It is a further object of the present invention to provide a system for detecting accumulation of ice on the upper surface of a wing of an aircraft.

It is an object of the present invention to provide a system for detecting accumulation of ice on an upper surface of a wing of an aircraft that is simple and reliable.

It is a further object of the present invention to provide a system for detecting accumulation of ice on an upper surface of a wing of an aircraft that alerts the pilot to an excessive accumulation of ice.

It is a further object of the present invention to provide a system for detecting accumulation of ice on an upper surface of a wing of an aircraft that is accurate despite the presence of droplets of rain or dry snow that does not adversely affect the lifting ability of the wing.

It is a further object of the present invention to provide a method for detecting accumulation of ice on an upper surface of a wing of an aircraft.

Further objects of the present invention will be made apparent in the following Best Mode for Carrying Out Invention and the appended claims.

The foregoing objects are accomplished in the preferred embodiment of the invention by a system for detecting accumulation of ice on an upper surface of a wing of an aircraft. The system includes an air pump for pumping air at a pressure slightly above atmospheric pressure. The air moves from the pump through a first conduit. The first conduit is connected to an air knife which distributes the air and exhausts it through a plurality of holes in the upper surface of the wing.

Air from the air pump also passes through a second conduit similar to the first conduit, and is conducted to a second air knife. The second air knife exhausts air from the second conduit through a series of holes in a bottom surface of the wing. Balancing valves are positioned in the first and second conduits so that airflow and pressure are balanced and are similar in both conduits.

A differential pressure sensor is connected by tap lines between the first and second conduits. The differential pressure sensor is set to indicate if the pressure difference between the first and second conduits exceeds a set value.

In operation, when ice accumulates on the upper surface of the wing, the openings through the air knife at the top of the wing are partially obstructed. Because the openings in the bottom wing surface are not obstructed, there is no corresponding increased resistance to flow through these openings.

The increased resistance to flow from the upper openings increases the back pressure in the first conduit. When the pressure difference exceeds the value set in the differential pressure sensor, an alarm condition is indicated to the pilot.

In rainy or dry snow conditions that are not causing ice to accumulate on the upper surface of the wings, the flow of air from the openings in the air knives clears the openings so that false alarms are not given.

BEST MODE FOR CARRYING OUT INVENTION

Figure 1:
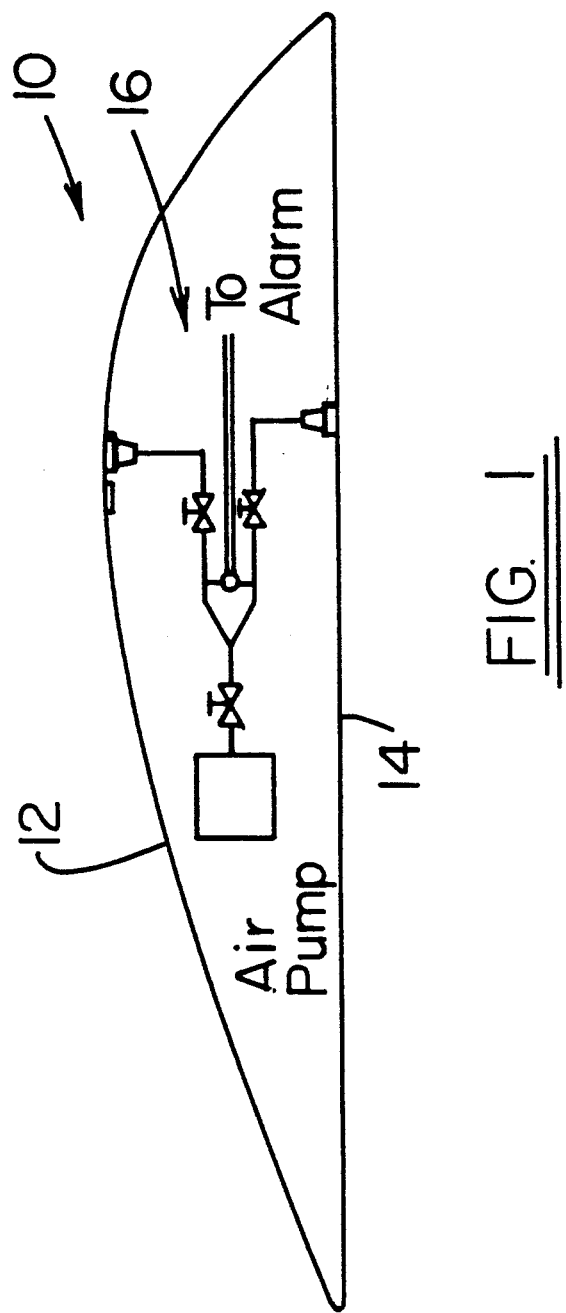
FIG. 1 is a cross sectional view of an aircraft wing incorporating the icing detection system of the preferred embodiment of the present invention.

Referring now to the drawings and particularly to FIG. 1, there is shown therein a cross sectional view of an aircraft wing, generally indicated 10. The wing has an upper surface 12 and a lower surface 14. Upper surface 12 is exposed to falling precipitation such as snow, ice pellets and rain, when the plane is sitting on the ground out of doors. The upper surface is a critical airflow surface for providing lift to the aircraft. It is the accumulation of ice on such surfaces that the system of the present invention is adapted to detect.

Figure 2:
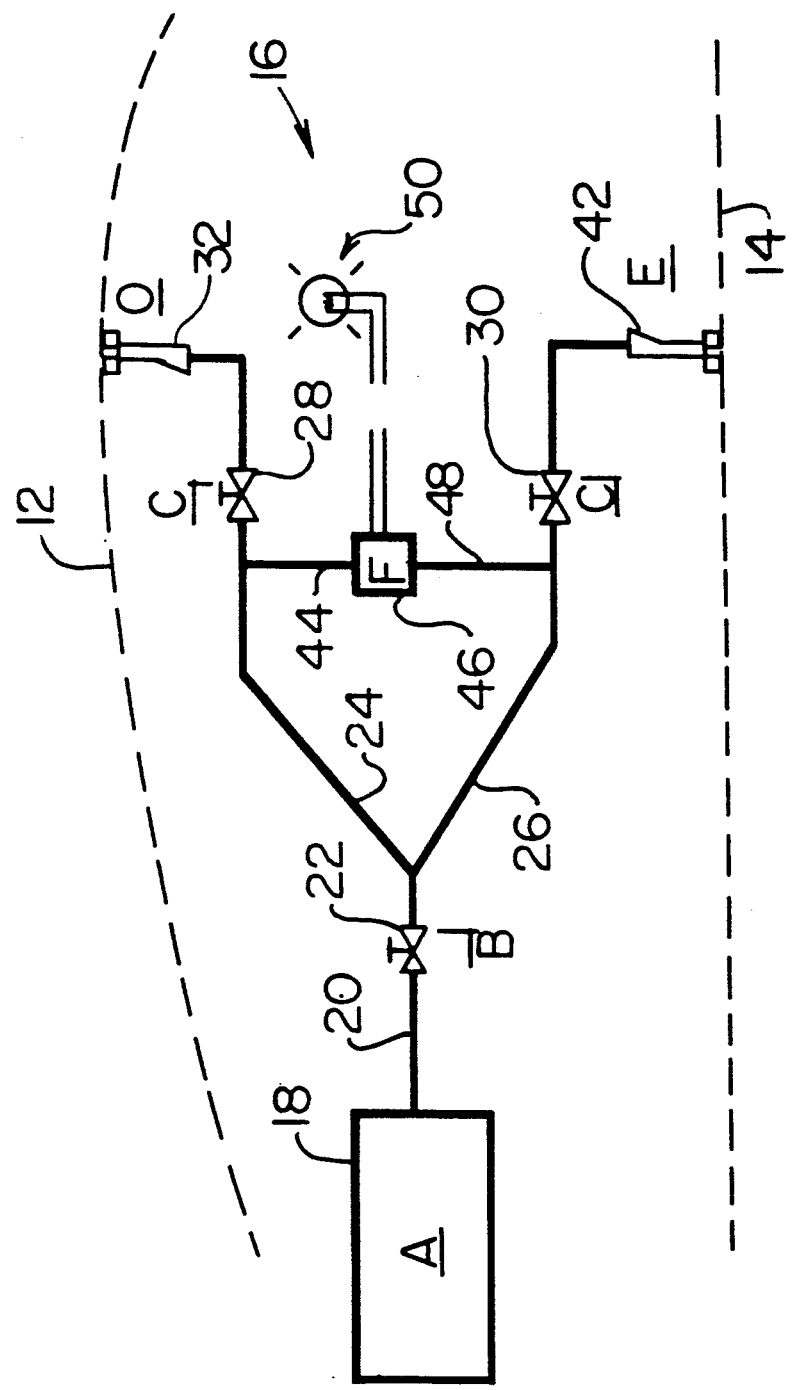
FIG. 2 is a schematic view of the aircraft icing detection system.

The aircraft icing detection system of the present invention 16 is shown schematically in FIG. 1. This system is shown in greater detail in FIG. 2. The aircraft icing detection system includes an air pump 18 for pumping air at a pressure slightly above atmospheric pressure and at a relatively low flow rate. The air pump delivers air into a distribution pipe 20, the flow through which is controlled by a primary flow valve 22. Primary flow valve 22 is manually adjustable to control the rate of flow.

From distribution pipe 20, the airflow is divided between a first conduit 24 and a second conduit 26. First conduit 24 includes a first balancing valve 28 for controlling flow through the first conduit. Balancing valve 28 is a manually adjustable valve to enable adjustment during setup as later explained, but it may also be locked in position. Second conduit 26 includes a similar second balancing valve 30.

Figure 3:
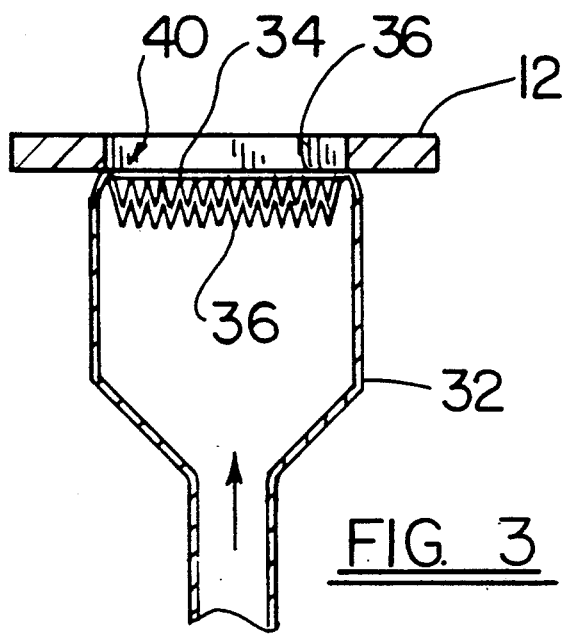
FIG. 3 is a cross sectional view of an air knife of the system.
Figure 4:
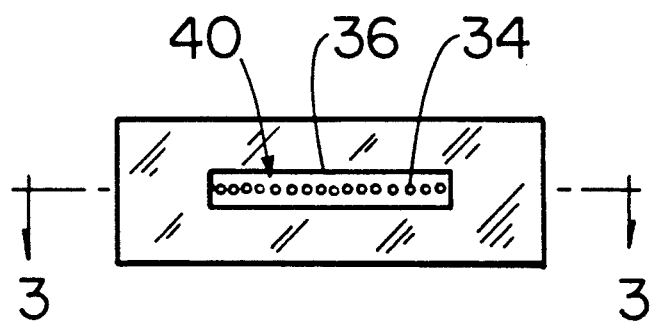
FIG. 4 is a top view of the outlets from the air knife shown in FIG. 3.

First conduit 24 is in fluid connection with a first air knife 32 (see FIG. 3). Air knife 32 includes a plenum for distributing airflow to a plurality of small first openings 34. Openings 34 extend through a faceplate 36 and are axially aligned and closely spaced. Air knife 32 includes baffles 38 for evenly dividing the flow between the openings 34. Faceplate 36 is positioned in a recess 40 which is slightly below the upper surface of the wing.

Second conduit 26 is in fluid connection with a second air knife 42. Second air knife 42 is similar to air knife 32 but exhausts air through the lower surface of the wing. Air knife 42 also has openings and is mounted in a small recess in the lower wing surface.

A first tap line 44 extends from first conduit to a differential pressure sensor 46. A second tap line 48, in fluid communication with second conduit 26, also extends to sensor 46. Differential pressure sensor 46 is adapted to sense the difference in pressure between conduits 24 and 26, and to produce an electrical signal indicative thereof.

In the preferred form of the invention, sensor 46 is an electrical switch that is preset to change its electrical condition upon the differential pressure exceeding a set amount. As shown schematically in FIG. 2, differential pressure sensor 46 is electrically connected to a warning light 50 which is in the cockpit of the aircraft to alert the pilot of a possible icing condition.

While the embodiment shown operates a warning light, it will be understood by those skilled in the art that in other embodiments the system of the present invention may be adapted to actuate other types of alarms, such as a buzzer. Alternatively, a differential pressure sensor that provides a signal representative of the differential pressure could be used to display the differential pressure on a gauge or other type of display.

In the preferred embodiment of the invention, the air pump is a low pressure type pump such as those used for bubbling air through an aquarium. A pump having a flow rate of 2,000 cubic centimeters per minute is used in the preferred embodiment, which is a type Advantage 400 Aquarium Pump sold by Doctor Pet Centers.

The air knives used in the preferred embodiment of the invention are Lechler 600.130.56BC with 16 openings approximately one millimeter in diameter. The differential pressure sensor in the preferred embodiment is a Micro Pneumatic Logic No. 502 which is sold in the Edmund Scientific Catalogue as No. 436,839.

The tubing for the conduits are standard plastic tubing in the preferred embodiment, but may be metal in other embodiments, depending on the service environment for the system. The balancing valves are small needle valves suitable for use with the tubing. It is preferred that the valves be manually adjustable for purposes of setup and calibration of the system, but it is desirable that they be locked in position using an adhesive or other locking means so that the initial settings are not disturbed due to vibration during flight.

In operation, the system is initially calibrated so that flow through conduits 24 and 26 is balanced. In the balanced condition there is little differential pressure between the conduits. The system is also adjusted so that the flow rate through the first air knife is in the range of 0.01 to 1.0 cubic feet per minute. At this flow rate, rain droplets or dry light snow are pushed away from the openings and do not impact operation of the system. Once the system is calibrated, the settings for the valves are locked.

During normal aircraft operations, when ice is not collecting on the wings prior to takeoff, the air pump operates normally and the pressure in conduits 24 and 26 remains balanced. As a result, no signal is given by differential pressure sensor 46. If rain or light snow falls on the upper wing surface but does not accumulate as ice, the airflow through openings 34 pushes the precipitation away and the operation of the system is not affected.

If ice begins to form on the upper surface of the wing, flow through first openings 34 is restricted. Flow through air knife 42 will not be similarly restricted because it delivers air through the lower surface of the wing and is not correspondingly blocked by the ice formation. As a result of the restriction of flow out of the first air knife, a differential pressure is sensed by sensor 46. Once the differential pressure exceeds a set amount, in the preferred embodiment about .004 psi, the warning light 50 alerts the pilot of a possible icing condition. The pilot may then have the plane de-iced.

While only one system of the present invention is shown in the drawings, it will be understood by those skilled in the art that systems may be installed in each wing. In addition, multiple systems supplied by either a single pump or multiple pumps may be installed in various lifting surfaces of the aircraft to detect ice formation on critical airfoil surfaces.

Thus, the new aircraft icing detection system achieves the above stated objectives, eliminates difficulties encountered in the use of prior devices and systems, solves problems and attains the desirable results described herein.

In the foregoing description certain terms have been used for brevity, clarity and understanding. However, no unnecessary limitations are to be implied therefrom because such terms are for descriptive purposes and are intended to be broadly construed. Moreover, the descriptions and illustrations given are by way of examples and the invention is not limited to the exact details shown or described.

Having described the features, discoveries and principles of the invention, the manner in which it is constructed and operated, and the advantages and useful results obtained; the new and useful structures, devices, elements, arrangements, parts, combinations, systems, equipment, operations and relationships are set forth in the appended claims.

I claim:

1. A system for detecting accumulation of ice on a surface of an aircraft, comprising:
   air pump means for pumping air;
   a first generally horizontal extending exterior surface of an aircraft, said first surface being on an upper side of said aircraft and exposed to precipitation falling from above;
   at least one first opening in said first horizontally extending surface;
   a second surface of said aircraft, said second surface not exposed to precipitation;
   at least one second opening in said second surface;

first conducting means for conducting air from said air pump means to said first opening;

second conducting means for conducting air from said air pump means to said second opening;

differential pressure sensing means for sensing a difference in pressure between said first and second conducting means; and indicating means in connection with said sensing means for indicting said pressure difference to an operator of said aircraft.

2. A system for detecting accumulation of ice on an aircraft, comprising:

an air pump;

a first generally horizontally extending exterior surface of an aircraft, said first surface being on an upper side of said aircraft and exposed to precipitation falling from above;

at least one first opening in said first horizontally extending surface;

a second surface of said aircraft, said second surface not exposed to precipitation;

at least one opening in said second surface;

a first conduit in fluid communication with said air pump and said first opening;

a second conduit in fluid communication with said air pump and said second opening;

a differential pressure sensor in fluid communication with said first and second fluid conduits;

an operator indicator in connection with said differential pressure sensor, whereby a differential pressure is indicated to an operator of said aircraft.

3. The system according to claim 1 wherein said first surface is an upper surface of a wing and said second surface is a lower surface of the wing.

4. The system according to claim 3 and further comprising a first air knife adjacent said first opening and in fluid communication with said first conducting means; and a second air knife adjacent said second opening and in fluid communication with said second conducting means.

5. The system according to claim 4 wherein said first opening includes a plurality of adjacent first holes.

6. The system according to claim 5 wherein said second opening includes a plurality of adjacent second holes.

7. The system according to claim 6 and further comprising a recess in said upper surface of said wing, said first holes extending in said recess.

8. The system according to claim 7 wherein said indicating means includes warning means for providing a warning when said pressure in said first conducting means exceeds pressure in said second conducting means by an amount.

9. The system according to claim 8 and further comprising first valve means in said first conducting means for regulating flow therethrough; and second valve means in said second conducting means for regulating flow therethrough; and wherein said first and second valve means are set to minimize differential pressure sensed by said differential pressure sensing means when said first holes and said second holes are unobstructed.

10. The system according to claim 9 wherein said differential pressure sensing means is adapted to indicate the alarm at a differential pressure generally above 0.001 psi.

11. The system according to claim 10 wherein said first holes comprise 16 first holes generally one millimeter in diameter, said first holes aligned linearly along a first axis, said first axis parallel of a longitudinal axis of said wing; said second holes comprise 16 second holes generally one millimeter in diameter, said second holes aligned linearly along a second axis, said second axis parallel of said longitudinal axis; and said air pump means delivers air at generally 2,000 cubic centimeters per minute at 0.02 psig.

12. A method for detecting accumulation of ice on a surface of an aircraft, comprising the steps of:

pumping air with pumping means;

conducting air from said pumping means in first conducting means;

passing air from said first conducting means to atmosphere through at least one first opening, said first opening in a first generally horizontally extending exterior surface of an aircraft, said first surface on an upper side of said exterior surface and exposed to precipitation falling from above;

conducting air from said pumping means in second conducting means;

passing air from said second conducting means to atmosphere through at least one second opening; said second opening in a second surface of said aircraft not exposed to precipitation falling from above;

sensing pressure differential between said first and second conducting means with pressure sensing means; and indicating to an operator of said aircraft when said pressure differential sensed by said sensing means exceeds an amount.

13. The method according to claim 12 wherein said method further comprises the step of indicating a warning when said differential pressure exceeds an amount.

14. The method according to claim 13 and further comprising the steps of:

controlling flow through said first conducting means with first valve means; and controlling flow through said second conducting means with second valve means, wherein there is generally no pressure differential between said first and second conducting means when said first openings are unobstructed by ice.

15. The method according to claim 14 wherein said flow through said first openings is of sufficient velocity to displace rain droplets and dry snow therefrom.

* * * * *